Oct. 30, 1934.  D. GREGG  1,978,862
CONTROL DEVICE
Filed Sept. 23, 1931
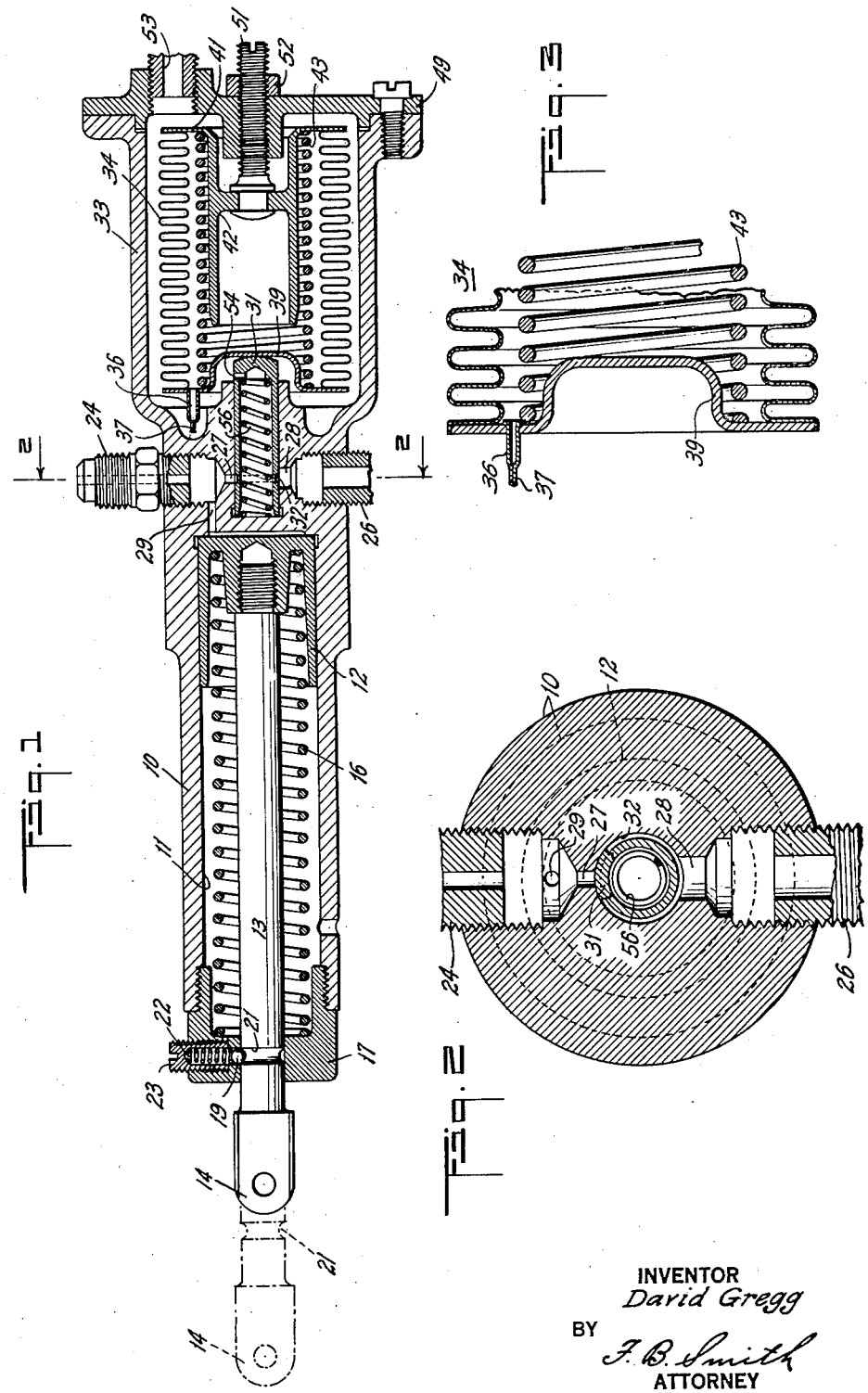
INVENTOR
David Gregg
BY
J. B. Smith
ATTORNEY Patented Oct. 30, 1934

1,978,862

UNITED STATES PATENT OFFICE 1,978,862

CONTROL DEVICE

David Gregg, Caldwell, N. J., assignor, by mesne assignments, to Eclipse Aviation Corporation, East Orange, N. J., a corporation of New Jersey Application September 23, 1931, Serial No. 564,665

3 Claims. (Cl. 121—38)

This invention relates to fluid actuated control devices, and more particularly to a fluid control device or servo-motor for regulating or controlling a motor accessory.

An object of the invention is to provide a servo-motor that operates at a predetermined fluid pressure.

Another object of the invention is to provide a servo-motor that may control or regulate an engine accessory in accordance with a predetermined pressure of a fluid responsive to engine operation.

Another object of the invention is to provide a servo-motor for an engine accessory, such as a supercharger, which may regulate or control the accessory in accordance with some predetermined pressure such as exists at the supercharger outlet.

Another object of the invention is to provide a servo-motor in which the cavities and machined openings are in tandem and extend in the same direction, whereby manufacturing and assembly are simplified.

Another object of the invention is to provide a servo-motor in which the pressure required for initial operation is greater than that required for subsequent operation, whereby there will be no "hunting" action at the engaging pressure.

Other objects of the invention, as well as features relating to advantage and utility in the construction of the device, will be apparent from the following description, in connection with which I have illustrated a preferred embodiment in the accompanying drawing, in which:

Fig. 1 is a longitudinal sectional view of the improved servo-motor;

Fig. 2 is an enlarged transverse sectional view taken on line 2—2 of Fig. 1; and, Fig. 3 is a fragmental view illustrating the construction of the expansible member.

In the drawing, 10 is a casing having a cylinder 11 within which reciprocates a piston 12 having a rod 13 secured thereto adapted to be connected to the driving control of an engine accessory by means of coupling 14. Piston 12 is normally urged to its inner position by spring 16 which coacts between the under side of the piston and the removable cap 17, in which is preferably mounted a ball 19 resiliently pressed into groove 21 in rod 13 by spring 22 adjustably secured in cap 17 by screw 23.

The mid portion of casing 10 is provided with fittings 24 and 26 adapted to be secured to a source of fluid pressure such as an engine oil pump, not shown. Transverse passages 27 and 28 are disposed opposite each other, whereby the oil or other liquid may flow across the casing from inlet fitting 24 to outlet fitting 26. A passage 29 provides communication between the inlet fitting 24 and the interior of cylinder 11. A cylindrical valve 31 is slidably interposed between transverse passages 27 and 28 and normally provides communication therebetween by means of annular groove 32.

Casing 10 is provided with an enlarged portion 33, within which is an expansible bellows 34 normally sealed with a predetermined pressure either above or below atmospheric pressure, as desired, but preferably having an internal pressure below atmospheric to prevent temperature effects. Tubular projection 36 is the means by which the air is extracted from the expansible member 34, after which the end of tube 36 may be sealed by any desired means, such as pinching the end and soldering, as indicated at 37. The inner end of expansible member 34 is preferably formed with a cup 39 adapted to contact with the end of valve 31. The outer end 41 of the expansible member has an inward extension 42 acting as a support for spring 43, and is adjustably secured to removable cap 49 by a screw 51 having a threaded connection with cap 49 and a swivel connection with the inwardly projecting member 42, by which the expansible member may be moved longitudinally of the casing and the relation between valve 31 and cup 39 adjusted to any desired position. After the adjustment is completed, lock nut 52 may be tightened to permanently hold the expansible member 34 in position.

The interior of the enlarged portion 33 of the casing forms a closed chamber about the expansible member 34 and is adapted to be connected to a source of pressure, not shown, by connection 53. Open-ended cylindrical valve 31 has its opposite sides balanced against the supercharger pressure by connecting the interior of the valve to the casing 33 by means of opening 54.

In the operation of the device, fittings 24 and 26 are preferably connected in the oil line of an engine, not shown, and clevis 14 is connected to the controlling mechanism of any accessory, such as a supercharger, not shown. Fitting 53 is preferably connected to the outlet passage of the supercharger, the arrangement being such that the supercharger is operatively connected when the clevis is in the position shown by the full lines in Fig. 1. In this position of the piston, groove 32 is in position to permit the oil to pass freely from fitting 24 to 26, but if for any reason the supercharger pressure should increase beyond a predetermined value, the expansible member 34 is collapsed by the exterior pressure transmitted into casing 33, and valve 31 will be moved toward the right, as viewed in Fig. 1, by means of spring 56. Movement of valve 31 toward the right causes annular groove 32 to shut off passage 27 and cause oil to flow through passage 29 into the cylinder 11 and force piston 12 toward the left to reduce the speed of the supercharger.

The initial movement of the piston is resisted by the resilient ball 19 which normally holds the piston against movement, but as soon as sufficient pressure has been built up in the cylinder to overcome the resistance of the ball, the plunger moves toward the left without any increased resistance being imposed upon it other than the slight frictional resistance caused by the ball 19 sliding over the surface of the rod 13.

It may be readily seen by the above description that a servo-motor has been provided in which the operating cylinder, the expansive member casing, and valve member 31 are arranged in tandem, that the unitary structure is very convenient to be machined and the component parts may be easily inserted from the opposite ends.

It will also be apparent that the improved servo-motor will operatively connect and disconnect an accessory to the engine at some predetermined absolute pressure, and that the engagement of a supercharger may be secured whenever the engine manifold pressure falls below this pressure, irrespective of the surrounding atmospheric pressure.

While a preferred embodiment of the invention has been illustrated and described, it is understood that this showing and description are illustrative only and that the invention is not regarded as limited to the form illustrated and described, or otherwise, except by the terms of the following claims.

What is claimed is:

1. A unitary servo-motor comprising a casing having a cylinder and a piston, said casing having aligned transverse passages through opposite walls thereof for conducting fluid and a passage in constant communication with one of the transverse passages and the cylinder, a longitudinally movable sleeve valve having an annular groove thereon adapted to control the flow of fluid through the transverse passages, an expansible device secured to one end of the casing adapted to expand longitudinally of the casing for opening the valve, and said valve having a spring therein urging it toward the expansible device.

2. A unitary servo-motor comprising a casing having a cylinder and a piston, said casing having aligned transverse passages extending through its opposite walls for conducting fluid and an unobstructed passage in constant communication with one of the transverse passages and the cylinder, a longitudinally movable sleeve valve having an annular groove thereon adapted to control the flow of fluid through the transverse passages, an expansible device in said casing adapted to expand longitudinally of the casing for opening the valve, a spring urging said sleeve valve toward the expansible device, said casing having its ends open whereby said piston and device are insertable through opposite ends of the casing, and removable caps at each end of the casing for retaining the piston and device therein.

3. A unitary servo-motor comprising a casing having a chamber, a cylinder coaxial therewith and a partition separating the same, said partition having an axial bore open to the chamber and closed to the cylinder, aligned transverse passages intersecting the axial bore and passing through the opposite walls of the casing, means forming a passageway in the partition leading from the transverse passageways to the cylinder, a piston in said cylinder, a valve in said bore having an annular groove thereon, said groove being in alignment with one of said transverse passageways when said valve is contacting the bottom of said bore, a spring urging said valve outwardly of said bore, an expansible device in the chamber having one end cooperating with the valve to control fluid flow through the aligned passages, a stem threaded through the chamber end wall, and said device having its opposite end swiveled to the inner end of the stem.

DAVID GREGG.